United States Patent
Kamimura et al.

(10) Patent No.: US 6,670,769 B2
(45) Date of Patent: Dec. 30, 2003

(54) IMAGE INPUT DEVICE

(75) Inventors: Shunsuke Kamimura, Shizuoka-ken (JP); Shinichi Suzuki, Shizuoka-ken (JP); Toshihiro Tamitsuji, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/193,997

(22) Filed: Jul. 15, 2002

(65) Prior Publication Data

US 2003/0011312 A1 Jan. 16, 2003

(30) Foreign Application Priority Data

Jul. 16, 2001 (JP) .......................................... 2001-215695

(51) Int. Cl.[7] ............................................. H05B 37/02
(52) U.S. Cl. ........................ 315/149; 315/307; 315/360
(58) Field of Search ................................. 315/149, 360, 315/362, 312, 307; 358/448, 462, 530

(56) References Cited

U.S. PATENT DOCUMENTS 6,351,081 B1 * 2/2002 Hwang ........................ 315/224
6,492,782 B2 * 12/2002 Ishizuka ...................... 315/360

FOREIGN PATENT DOCUMENTS

JP      59-053865      3/1984      .......... G03G/15/01

* cited by examiner

Primary Examiner—Hoang V. Nguyen
(74) Attorney, Agent, or Firm—Nath & Associates PLLC; Gary M. Nath

(57) ABSTRACT

An image input device includes a turn-on circuit and a converting circuit for receiving light reflected at an object and converting it into an electrical signal. The image input device is connected to a laser device as an output device. The turn-on circuit includes a triangular wave generating circuit, an error amplifier, a pulse width modulator, a lamp turn-on circuit, a xenon lamp and a protection circuit. The converting circuit includes an oscillator, a system control unit having a microprocessor to control the whole image input device, and image sensors. A same clock having a certain frequency from the oscillator is supplied to the turn-on circuit and the system control unit in the converting circuit thereby controlling the turn-on circuit to synchronize with driving signals of the image sensors.

2 Claims, 4 Drawing Sheets

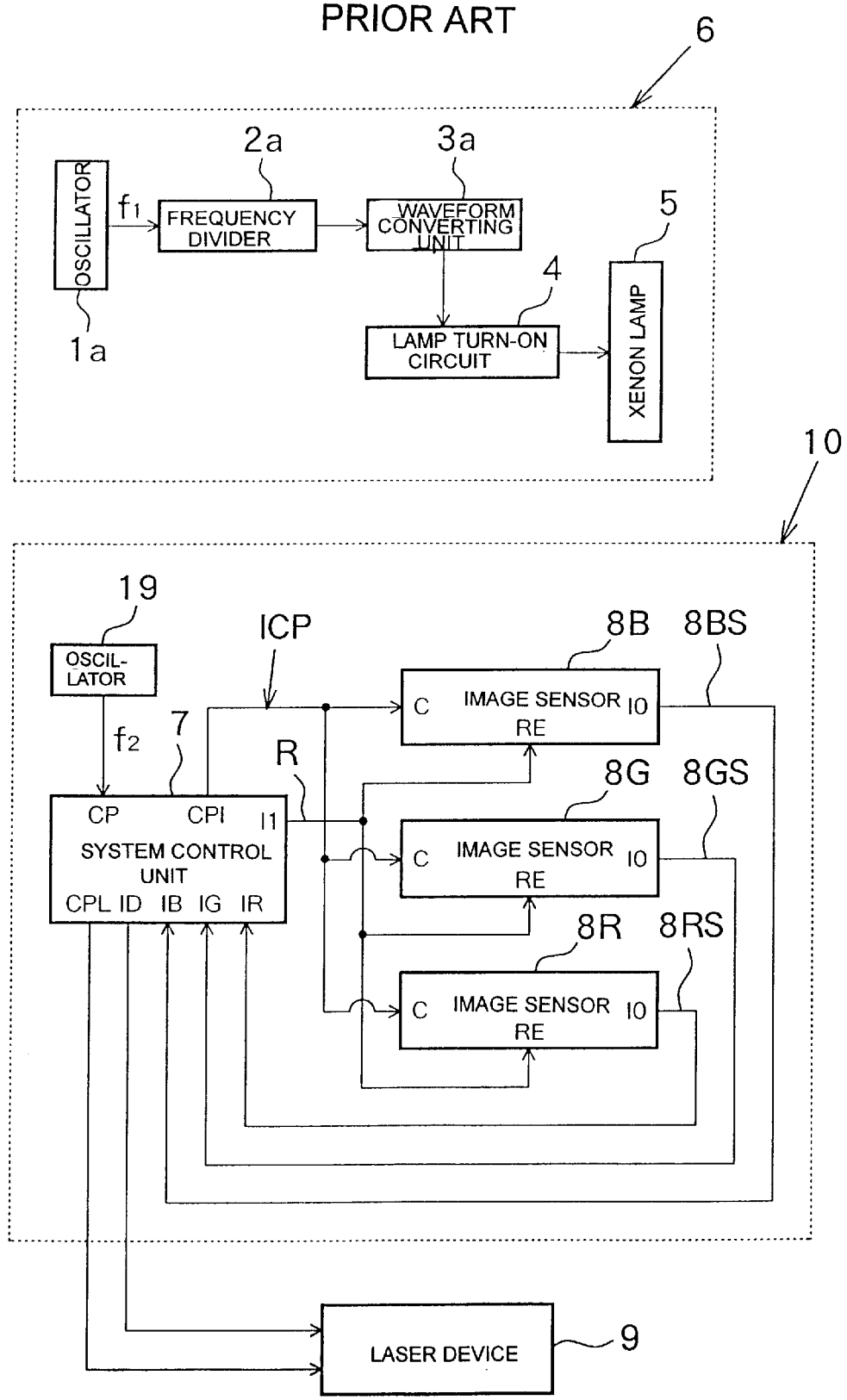

IMAGE INPUT DEVICE

BACKGROUND OF THE INVENTION

1. Field of the Invention

The present invention relates to an image input device and particularly to an image input device in which an image sensor output is not affected by fluctuations in frequency when a rare gas discharge lamp is turned on.

2. Description of the Related Art

Conventionally, various apparatuses using an image input device, particularly a color image input device have been produced, for example, a color copying machine, which uses a combination of a color image input device and a laser beam printer (LBP), and a film scanner. Generally, these apparatuses are required to process a large amount of image data at high speed.

In the image input device, a photoelectric converting unit, which sheds light on an object and converts light reflected at the object into an electrical signal, includes a light source for shedding light on the object, an optical system for focusing the reflected light from the object, and image sensors for receiving the light focused and converting it into an electrical signal.

The image input device uses one-dimensional image sensors and two-dimensional image sensors according to the shape of the object, speed, and resolution, and also uses various transferring mechanisms for transferring the object. In the color image input device, the optical system uses color filters for color separation.

In order to process images at high speed, the image sensors constituting the image input device must be operated at high speed. An output $I(\lambda)$ of each image sensor varies with the illuminance of light shed on an object, namely, an output $L(\lambda)$ of a light source, the reflectance K of an object, the brightness (transmittance) U of a lens, the accumulating time T of each image sensor, the sensitivity $S(\lambda)$ of a wavelength of each image sensor, and the transmittance $F(\lambda)$ of each color separation filter. Strictly speaking, the reflectance K of an object varies with the wavelength of light. However, this fact does not affect the spirit of the present invention, so the reflectance K of an object and the brightness U of a lens are set to respective constant values independently of the wavelength of light. For the purpose of simplification, the description hereinbelow will be made on the assumption that the reflectance K of an object and the brightness U of a lens are each set to 1 and that the amount $P(\lambda)$ of light incident on each image sensor is proportional to the output $L(\lambda)$ of a light source.

For example, a xenon lamp, which is one kind of rare gas discharge lamp and affects the incident light amount $P(\lambda)$, is used in the color image input device because it generates an output $L(\lambda)$ which has rumination characteristics similar to the wavelength characteristics of natural daylight, and which has high luminance. The spectral sensitivity of a CCD line sensor, which is generally used as a color image sensor and which affects the sensitivity $S(\lambda)$ of an image sensor, is low for short-wavelength light. As to the characteristics of optical glass filters, which are generally used as color separation filters affecting the transmittance $F(\lambda)$, generally speaking, a blue-base optical glass filter has a high transmittance and gentle characteristics, and gets mixed therein light having a wavelength other than the blue-base wavelength, a green-base optical glass filter has a low transmittance, and a red-base optical glass filter gets light of an infrared range mixed therein.

The output $I(\lambda)$ of each image sensor is deteriorated due to the influence of the wavelength characteristics of the constituent members. Particularly for the blue-base light, the output is low in the sensor sensitivity, the filter transmittance and the light output, and the output of the image sensor influenced thereby is reduced compared with the red-base sensor and is most strongly affected by fluctuations in the amount of light from the lamp.

The above mentioned parameters are determined in consideration of the characteristics of the constituent members so that respective outputs of the image sensors for generating colors are as equal to one another as possible. Among the parameters, the $S(\lambda)$ and the $F(\lambda)$ do not vary once determined, while the $P(\lambda)$ to be inputted and the T fluctuate by a turn-on circuit in such a manner that the $P(\lambda)$ varies with fluctuation in a lamp-driving voltage and the T varies to a driving frequency of the image sensor.

In order to solve the above-mentioned problem that the image sensor output varies with fluctuation in a lamp-driving voltage, an invention was disclosed in Japanese Patent Laid-open No. Sho 59-53865. The invention includes image sensors having optical filters corresponding to respective wavelengths of three colors of red, blue and green, and scans one same image three times corresponding to the three color sensors. Since the sensitivities of the image sensors differ for the wavelength of a light source, the voltage of the light source is varied for each image sensor in the three-time scanning operation to control the outputs of the image sensors at a predetermined value.

FIG. 4 shows a conventional circuit using a xenon lamp as a light source. The circuit has a turn-on circuit 6 and a converting circuit 10, as described below. The turn-on circuit 6 includes an oscillator 1a, a frequency divider 2a, a waveform converting unit 3a, a lamp turn-on circuit 4 and a xenon lamp 5. In order to obtain a high power, the xenon lamp 5 is generally driven by an AC pulse voltage. The converting circuit 10, which receives light reflected at an object and converts it into an electrical signal, includes an oscillator 1b, a system control unit 7 having a microprocessor to control the whole image input device, and image sensors 8B, 8G and 8R. When the converting circuit 10 is combined with a laser device 9, the system control unit 7 is connected to the laser device 9.

The turn-on circuit 6 operates as follows. A clock having a frequency f1 is supplied from the oscillator 1a to the frequency divider 2a. The clock with the frequency f1 is frequency-divided by the frequency divider 2a and then supplied to the waveform converting unit 3a. The waveform converting unit 3a, which includes a triangular wave generator and a pulse width modulator (they are not shown), generates a conventionally-known two-phase rectangular wave and supplies it to the lamp turn-on circuit 4. The lamp turn-on circuit 4 generates a predetermined voltage with a predetermined frequency. The xenon lamp 5 is turned on at the predetermined frequency by the applied voltage.

The converting circuit 10 operates as follows. A clock CP having a frequency f2 is supplied from the oscillator 1b independent of the oscillator 1a to the system control unit 7. Then, a microprocessor (not shown) starts a predetermined operation. The system control unit 7 outputs from a terminal CPI a clock ICP to drive each image sensor and from a terminal I1 a reset signal R to read an electrical signal stored in each image sensor, and supplies the clock ICP and the reset signal R respectively to a clock terminal C and a reset terminal RE of each of the image sensors 8B, 8G and 8R, and each image sensor performs conventionally-known operation.

That is, each of the image sensors 8B, 8G and 8R has a buffer memory (not shown) for one line therein and transfers the electrical signals stored by the previous scanning to the buffer memory for one line on the basis of the signal R. Synchronizing with the scanning for next one line, each image sensor outputs the contents of the buffer memory for the one line from respective terminals IO. Signals 8BS, 8GS and 8RS of the image sensors 8B, 8G and 8R outputted from the respective terminals 10 are supplied respectively to terminals IB, IG and IR of the system control unit 7, and stored in buffer memories (not shown) located in the system control unit 7.

The signals of the image sensors stored in the buffer memories (not shown) in the system control unit 7 are transferred to the laser device 9 as necessary and outputted therefrom by a conventional laser printer.

According to the invention disclosed in the above-mentioned Japanese Patent Laid-open, the image sensor output can be inhibited from fluctuating due to variations in the lamp-driving voltage. The invention, however, cannot solve the problem that the output varies with fluctuation in the accumulating time T of light incident on each image sensor.

In the conventional example shown in FIG. 4, the turn-on circuit 6 and the converting circuit 10 have the oscillator 1a and the oscillator 1b, respectively. Accordingly, it can happen that due to the difference between the frequency of the accumulating time T of light incident on each image sensor and the turn-on frequency FL, the number of turning-on of the lamp during the light accumulating time T includes a fraction. Consequently, when the image sensors are operated at high speed, the following problem occurs. On the assumption of FL (the turn-on frequency of the xenon lamp 5)=121.44 kHz (1-pulse driving interval: 8.2345 $\mu$S) and TS (scanning time for one line of each of the image sensors 8B, 8G and 8R)=3 mS, the number of pulses for turning on the lamp during the scanning time TS includes a fraction, namely, 364 or 365. In case of TS=362 $\mu$S in order to operate the image sensors at high speed, the number of pulses for turning on the lamp during the scanning time TS is 43 or 44.

Accordingly, in case of FL=121.44 kHz and TS=3 mS, the variation in one pulse supplied to the xenon lamp 5 during one scanning time (TS=3 mS) of each image sensor is 1/365 or less. However, in case of FL=121.44 kHz and TS=362 $\mu$S, the variation in one pulse supplied to the xenon lamp 5 during one scanning time (TS=362 $\mu$S) of each image sensor is 1/44. The fraction included in the number of pulses to turn on the lamp is caused by the fluctuation in the frequency of the oscillator la or fluctuation in the lamp turn-on timing. Accordingly, in case of the image sensor operating at high speed, the influence is large when the pulse to turn on the lamp is shifted by one pulse.

In order to reduce the influence due to the fluctuation in the frequency of the oscillator 1a, the lamp turn-on frequency may be increased. However, the xenon lamp and other lamps have an upper limit on the turn-on frequency. When the lamp is turned on at a frequency exceeding the upper limit, various problems are caused such as deterioration in luminance, partial turn-on, and reduction in life. Accordingly, it is difficult to increase the lamp turn-on frequency for solving the problem. As mentioned above, the accumulating time varies with the turn-on frequency of the image sensor. For example, under the above-mentioned conditions of FL=121.44 kHz (1-pulse driving interval: 8.2345 $\mu$S) and TS=362 $\mu$S, the variation of 1/44 in one pulse to be supplied to the xenon lamp 5 comes out straight as an output fluctuation in the image sensor giving variation 2% or more for one pulse.

SUMMARY OF THE INVENTION

Accordingly, it is an object of the present invention to solve the above problems thereby providing an image input device which realizes a stable output even when a lamp is turned on at a high frequency affecting accumulating time of an image sensor.

In order to accomplish the above object, according to a first aspect of the present invention, an image input device comprises: a rare gas discharge lamp which sheds light on an object and is turned on by a high AC pulse voltage; and image sensors which convert an intensity of light reflected at the object into an electrical signal and are driven synchronously with the rare gas discharge lamp.

According to a second aspect of the present invention, in the first aspect, the image sensor and the rare gas discharge lamp are driven synchronously by controlling a turn-on circuit for the rare gas discharge lamp through an image transfer signal from the image sensor.

BRIEF DESCRIPTION OF THE DRAWINGS

FIG. 4 is a block diagram of a conventional circuit using a xenon lamp as a light source.

DESCRIPTION OF THE PREFERRED EMBODIMENT

Figure 1:
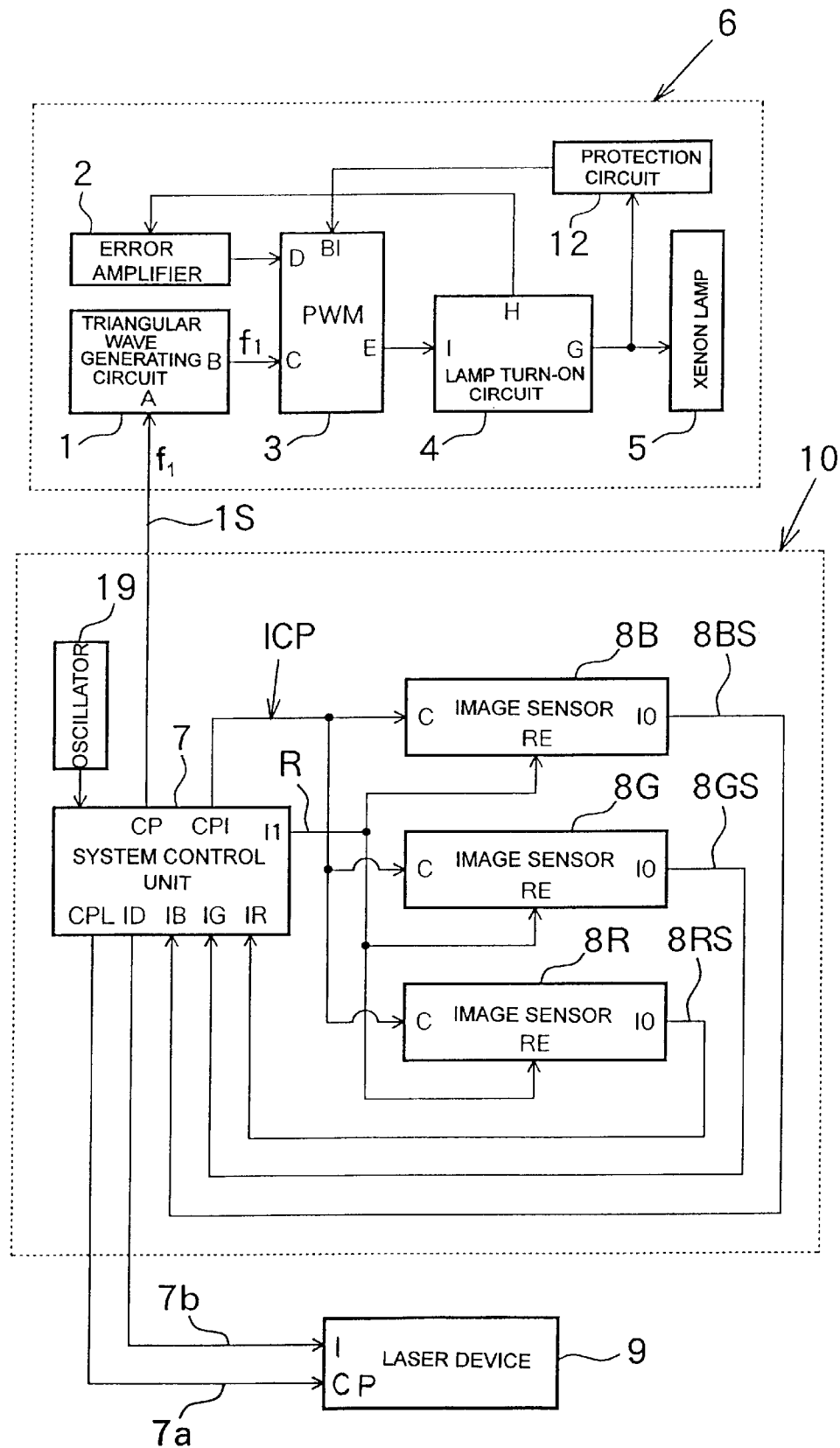
FIG. 1 is a block diagram of an embodiment according to the present invention.

The present invention will now be described hereinbelow with reference to FIG. 1. FIG. 1 shows a turn-on circuit 6, a converting circuit 10 adapted to receive light reflected at an object and convert the light into an electrical signal, both the circuits constituting an image input device, and a laser device 9 as an output device. The turn-on circuit 6 includes a triangular wave generating circuit 1, an error amplifier 2, a pulse width modulator (PWM) 3, a lamp turn-on circuit 4, a xenon lamp 5, and a protection circuit 12. The converting circuit 10, which receives light reflected at the object and converts the light into an electrical signal, includes an oscillator 19, a system control unit 7 having a microprocessor to control the whole image input device, and image sensors 8B, 8G and 8R.

A clock 1S having a frequency f1 is supplied from a terminal CP of the system control unit 7 in the converting circuit 10 to the triangular wave generating circuit 1 in the turn-on circuit 6. The system control unit 7 is connected to the laser device 9 through signal lines 7a and 7b such that the signal line 7a connects a terminal CPL of the system control unit 7 to a terminal CP of the laser device 9, and the signal line 7b connects a terminal ID of the system control unit 7 to a terminal I of the laser device 9.

The components in the turn-on circuit 6 are connected as follows. An output terminal B of the triangular wave generating circuit 1 is connected to an input terminal C of the PWM 3. An output of the protection circuit 12 is connected to another input terminal BI of the PWM 3. An output of the error amplifier 2 is connected to still another input terminal D of the PWM 3. An output terminal E of the PWM 3 is connected to an input terminal I of the lamp turn-on circuit 4. The protection circuit 12, which prevents an unnecessary driving pulse from being supplied to the lamp when the lamp is not turned on, and the xenon lamp 5 are connected to an output terminal G of the lamp turn-on circuit 4. An input terminal of the error amplifier 2 is connected to another output terminal H of the lamp turn-on circuit 4.

The components in the converting circuit 10 are connected as follows. The system control unit 7 includes a microprocessor (not shown). The terminal CP of the system control unit 7 is connected to an input terminal A of the triangular wave generating circuit 1 in the turn-on circuit 6. Clock terminals C and reset signal terminals RE of the image sensors 8B, 8G and 8R are connected respectively to output terminals CPI and I1 of the system control unit 7. When the laser device 9 is used together, the system control unit 7 is connected to the laser device 9 such that the output terminal CPL and the output terminal ID of the system control unit 7 are connected respectively to the clock terminal CP and the data input terminal I of the laser device 9. Output terminals IO of the image sensors 8B, 8G and 8R are connected to respective input terminals IB, IG, and IR of the system control unit 7.

The turn-on circuit 6 operates as follows. A triangular-wave voltage corresponding to the frequency f1 is applied from the output terminal B of the triangular wave generating circuit 1 to the input terminal C of the PWM 3. On the other hand, a voltage from the output terminal H of the lamp turn-on circuit 4 is amplified/compared by the error amplifier 2, and outputted to the input terminal D of, the PWM 3. The PWM 3 compares the triangular-wave voltage corresponding to the frequency f1 with the output of the error amplifier 2 and outputs a pulse width modulation signal (PWM signal) having the same frequency as the frequency f1. When the output is supplied to the lamp turn-on circuit 4, the lamp turn-on circuit 4 generates a voltage having the predetermined frequency f1 and applies the voltage to the xenon lamp 5. The xenon lamp 5 is turned on at the predetermined frequency f1 by the applied voltage.

The converting circuit 10 operates as follows. The clock 1S with the frequency f1 is supplied from the terminal CP of the system control unit 7 to the terminal A of the triangular wave generating circuit 1. Namely, the turn-on circuit 6 and the converting circuit 10 receive the clocks from the same oscillator 19. Accordingly, the accumulating time T of light incident on the image sensor has an integer multiple relation with the turn-on frequency f1, so that no fraction is included in the number of turn-on times of the lamp turned-on during the light accumulating time T.

When a clock is supplied from the oscillator 19 to the system control unit 7, the microprocessor (not shown) starts the predetermined operation. The system control unit 7 outputs, from the terminal CPI to each image sensor, a clock ICP to drive each of the image sensors 8B, 8G and 8R. The system control unit 7 also outputs, from the terminal I1 to each image sensor, a reset signal R to read out signals stored in each image sensor. The clock ICP and the reset signal R are supplied respectively to the clock terminal C and the reset terminal RE of each image sensor, whereby each image sensor performs conventionally-known operation.

Namely, each of the image sensors 8B, 8G and 8R has a buffer memory (not shown) for one line therein and transfers signals stored by the previous scanning to the buffer memory for one line on the basis of the reset signal R. Synchronizing with the scanning of next one line, each of the image sensors outputs the contents of the buffer memory for the one line from the terminal 1O. Signals 8BS, 8GS and 8RS of the image sensors 8B, 8G and 8R outputted from the respective terminals IO are supplied respectively to the terminals IB, IG and IR of the system control unit 7 and stored in buffer memories (not shown) located in the system control unit 7.

The signals 8BS, 8GS and 8RS stored in the buffer memories (not shown) in the system control unit 7 are transferred to the laser device 9 as necessary and outputted by a conventional laser printer at a predetermined timing, such that an image, which is stored in the buffer memories (not shown) in the system control unit 7, is outputted when accumulated for an amount of one line or one page.

Figure 2:
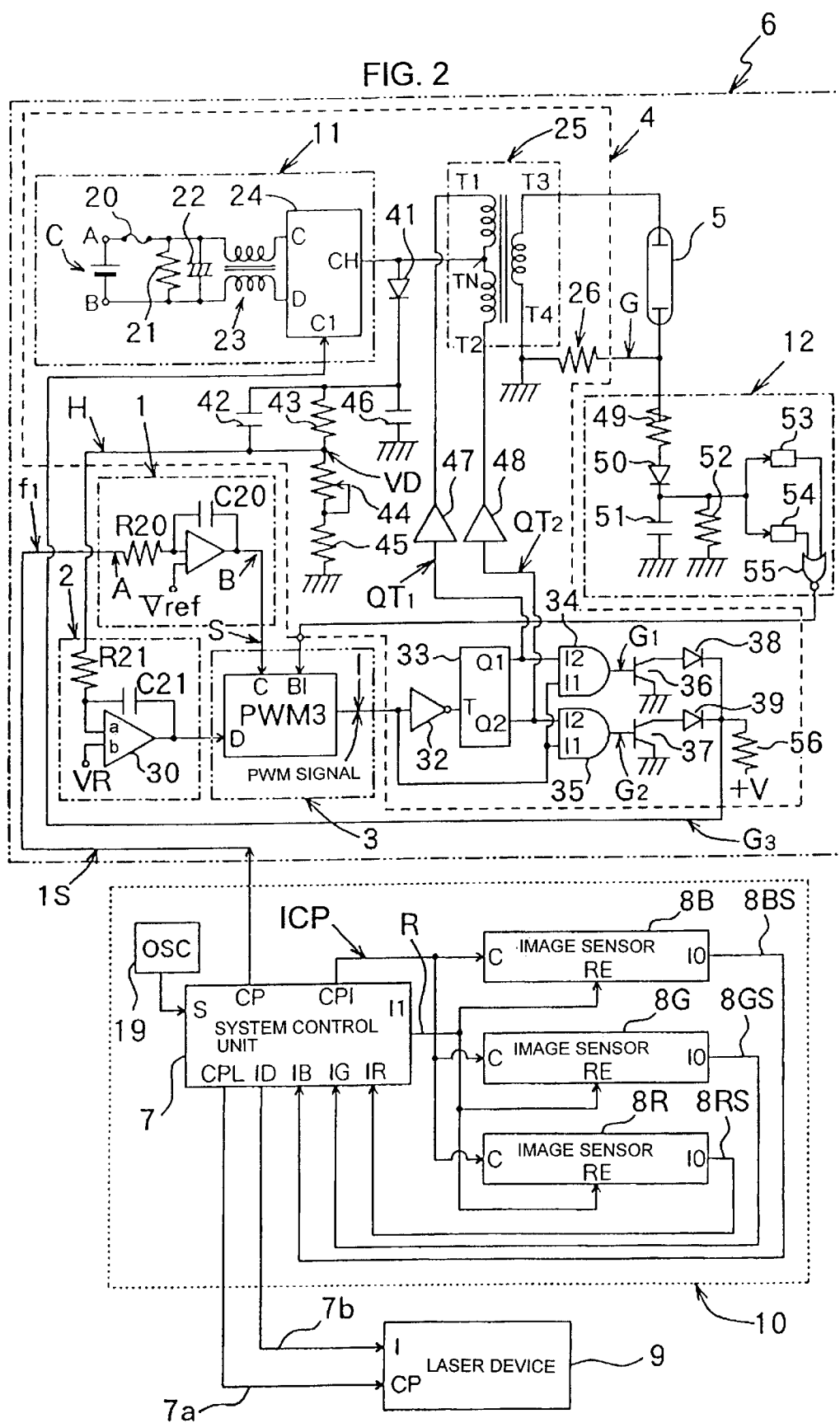
FIG. 2 is a circuit diagram of the embodiment shown in FIG. 1.

The present invention will now be further described hereinbelow with reference to FIG. 2 representing the circuit diagram of the embodiment shown in FIG. 1. In FIG. 2, the same components as those in FIG. 1 are designated by the same reference numerals and symbols. The connection, etc. between the turn-on unit 6, the control unit 7 and the laser device 9 remain same and therefore the explanation thereof is not repeated here. And, since the converting circuit 10 and the laser device 9 in FIG. 2 are similar to those in FIG. 1, the description thereof is omitted, and only the turn-on circuit 6 will now be described hereinbelow.

The turn-on circuit 6 includes the triangular wave generating circuit 1, the error amplifier 2, the PWM3, the lamp turn-on circuit 4, the xenon lamp 5 and the protection circuit 12, as described above.

A triangular-wave voltage output having the same frequency as the frequency f1 of the triangular wave generating circuit 1 and a lamp driving voltage obtained from the lamp turn-on circuit 4 are commutated to obtain a voltage VD divided into a predetermined value. The voltage VD is amplified by the error amplifier 2 and applied to the PWM 3. The PWM 3 generates a signal subjected to pulse width modulation according to the voltage VD.

The lamp turn-on circuit 4 has the following construction. An output CH of a chopper circuit 11 is connected to a central terminal TN of an input winding in a step-up transformer 25 and an anode terminal of a diode 41. An output of a lamp driving circuit 47 is connected to one terminal T1 of the input winding in the step-up transformer 25 and an output of a lamp driving circuit 48 is connected to the other terminal T2 of the input winding. A cathode terminal of the diode 41 is connected to a resistor 43 and capacitors 42 and 46.

The resistor 43 and the capacitor 42 are connected in parallel to each other and are connected to a variable resistor 44. The variable resistor 44 is connected to a resistor 45. The resistor 45 and the capacitor 46 are grounded at the other terminal. A connection point between the resistor 43 and the variable resistor 44 is connected via a resistor R21 to an input terminal a of an amplifier 30 constituting the error amplifier 2. The resistors 43 and 45 and the variable resistor 44 constitute a voltage dividing circuit to adjust the variable resistor 44, thereby adjusting a voltage applied to the input terminal a of the amplifier 30.

One terminal T3 of an output winding in the step-up transformer 25 is connected to one terminal of the xenon lamp 5, and the other terminal T4 of the output winding is grounded. The other terminal of the xenon lamp 5 is connected to a resistor 26, then grounded, and also connected to a resistor 49 as an input terminal of the protection circuit 12. The protection circuit 12 detects an overvoltage applied to the xenon lamp 5 and an overcurrent flowing into the xenon lamp 5, thereby preventing electric breakdown of the transformer due to the overvoltage and burning of the step-up transformer 25 due to the overcurrent. An anode terminal of a diode 50 is connected to the input resistor 49 of the protection circuit 12. One terminal of a resistor 52 and one terminal of a capacitor 51 are connected in parallel to a cathode terminal of the diode 50. The other terminal of the resistor 52 and the other terminal of the capacitor 51 are grounded. An overcurrent detecting circuit 53 and an overvoltage detecting circuit 54, which are conventionally-known, are connected in parallel to the cathode terminal of the diode 50. An output of the overcurrent detecting circuit 53 and an output of the overvoltage detecting circuit 54 are connected to an input of an OR circuit 55. An output of the OR circuit 55 is supplied to the terminal BI of the PWM 3.

The output of the PWM 3 is connected to a clock terminal T of a toggle flip-flop 33 via an inverter circuit 32. Outputs Q1 and Q2 of the toggle flip-flop 33 are connected to inputs of the lamp driving circuits 47 and 48, respectively, and also connected to one input terminals I2, I2 of an AND gates 34 and 35, respectively. The other input terminals I1, I1 of the AND gates 34 and 35 are connected to the output of the PWM 3. Respective outputs of the AND gates 34 and 35 are connected to base terminals of transistors 36 and 37. Emitter terminals of the transistors 36 and 37 are grounded, and respective collector terminals thereof are connected to anode terminals of diodes 38 and 39. A cathode terminal of the diode 38 is connected to a cathode terminal of the diode 39. Cathode terminals of the diodes 38 and 39 are connected to each other, and then connected to one terminal of a resistor 56 and a driving terminal C1 of a switching circuit 24 in the chopper circuit 11. A plus power supply is connected to the other terminal of the resistor 56. The diodes 38 and 39 and the resistor 56 constitute an OR circuit.

The chopper circuit 11 for converting a DC voltage into an AC voltage has the following configuration. A DC voltage C is applied to a reactor 23 via a fuse 20. A resistor 21 and a capacitor 22 are connected in parallel to an input of the reactor 23. An output terminal of the reactor 23 is connected to input terminals C and D of the switching circuit 24.

Figure 3:
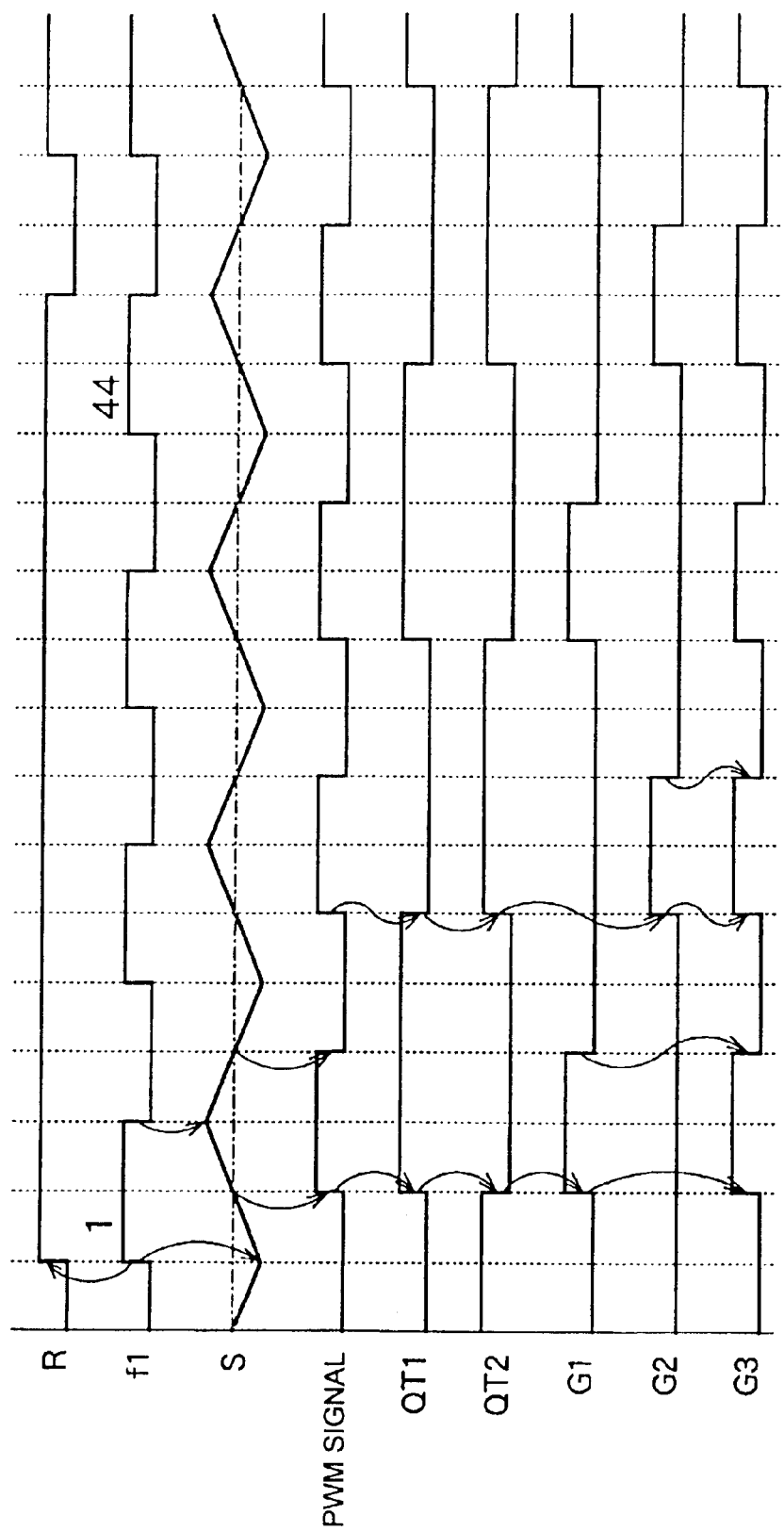
FIG. 3 is a timing chart explaining the operation of the embodiment shown in FIG. 2.

The operation of the present invention will now be described with reference to FIG. 3.

The triangular wave generating circuit 1 generates a signal S, when receiving the clock with the frequency f1.

The system control unit 7, when receiving the clock from the oscillator 19, generates a predetermined conventionally-known clock ICP to operate each of the image sensors 8B, 8G and 8R and a conventionally-known reset signal R to transfer signals accumulated in each of the image sensors 8B, 8G and 8R to the buffer memories (not shown).

The reset signal R is synchronized with the frequency f1 by the system control unit 7, has, for example, 2.76 kHz obtained by dividing the frequency f1 (=121.44 kHz) into 1/44, and is supplied to the reset terminal RE of each of the image sensors 8B, 8G and 8R.

A reference voltage VR is applied to the input terminal b of the amplifier 30. On turning on the lamp, an AC output voltage is generated in the switching circuit 24 in the chopper circuit 11, rectified by the diode 41, divided by the dividing circuit constituted by the resistors 43 and 45 and the variable resistor 44, and applied to the input terminal a of the amplifier 30 as a voltage VD according to the reference voltage VR.

The PWM 3 compares the output of the amplifier 30 with the output of the triangular wave generating circuit 1 (triangular-wave voltage) to adjust the luminance of the xenon lamp 5 at the turn-on time. Specifically, the PWM 3 increases gradually a pulse width through a conventionally-known method until the output of the amplifier 30 is obtained, and generates a PWM signal with a predetermined constant pulse width when the output of the amplifier 30 is obtained.

Signals QT1 and QT2 are obtained such that the PWM signal is made into ½ by the inverter circuit 32 and the toggle flip-flop 33. The PMW signal and the signals QT1 and QT2 are supplied to the AND gates 34 and 35 to obtain signals G1 and G2. An OR signal G3 by the signals G1 and G2 is obtained by the diodes 38 and 39 and the resistor 56. The signal G3 is supplied to the driving terminal C1 of the switching circuit 24 in the chopper circuit 11. The signals QT1 and QT2 are supplied respectively to the input terminals T1 and T2 of the step-up transformer 25, and, together with the signal supplied to the driving terminal C1 of the switching circuit 24 in the chopper circuit, increased by the step-up transformer 25 up to a pulse voltage required to turn on the xenon lamp 5. The pulse voltage is synchronized with the signals QT1 and QT2, that is, with the reset signal R adapted to store signals in the system control unit 7, whereby no fraction is included in the pulse voltage, which is applied to the lamp between the reset signals R.

When the overcurrent detecting circuit 53 and the overvoltage detecting circuit 54 detect an abnormal condition, the output of the OR circuit 55 decreases, so that the PWM 3 is stopped. When the PWM 3 is stopped, the signals QT1 and QT2 are not generated. Consequently, the lamp turn-on voltage is not applied, resulting in prevention of damages to the step-up transformer 25.

According to the image input device of the first aspect of the present invention, a rare gas discharge lamp is turned on by a high AC pulse voltage and the image sensors are driven synchronously with the rare gas discharge lamp, whereby even when a lamp such as a xenon lamp is turned on at a high frequency affecting the accumulating time of each image sensor, it does not happen that the output of each image sensor fluctuates due to the fraction between the turn-on frequency and the accumulating time of each image sensor. Consequently, a stable image input device can be provided.

According to the image input device of the second aspect of the present invention, in the first aspect, the image sensor and the rare gas discharge lamp are driven synchronously with each other by controlling the turn-on circuit for the rare gas discharge lamp through an image transfer signal from each image sensor, whereby the lamp can be turned on synchronously with the timing to input the image into the system control unit. Thus, the lamp is not turned off during the accumulation of images and stable images can be inputted.

What is claimed is:

1. An image input device comprising:
   a rare gas discharge lamp shedding light on an object, the rare gas discharge lamp being turned on by a high AC pulse voltage; and
   image sensors converting an intensity of light reflected at the object into an electrical signal, the image sensors being driven synchronously with the rare gas discharge lamp.

2. An image input device according to claim 1, wherein the image sensors are driven synchronously with the rare gas discharge lamp by controlling a turn-on circuit for the rare gas discharge lamp through an image transfer signal from the image sensors.

* * * * *